US010768429B2

(12) United States Patent
Ito

(10) Patent No.: US 10,768,429 B2
(45) Date of Patent: Sep. 8, 2020

(54) IMAGE DISPLAY DEVICE

(71) Applicant: JVC KENWOOD Corporation, Yokohama-shi, Kanagawa (JP)

(72) Inventor: Fumihiko Ito, Yokohama (JP)

(73) Assignee: JVCKENWOOD CORPORATION, Yokohama-Shi, Kanagawa (JP)

( * ) Notice: Subject to any disclaimer, the term of this patent is extended or adjusted under 35 U.S.C. 154(b) by 112 days.

(21) Appl. No.: 16/230,976

(22) Filed: Dec. 21, 2018

(65) Prior Publication Data

US 2019/0278085 A1    Sep. 12, 2019

(30) Foreign Application Priority Data

Mar. 12, 2018    (JP) .................................. 2018-043947

(51) Int. Cl.
| | | |
|---|---|---|
| *G02B 27/14* | (2006.01) | |
| *G02B 27/01* | (2006.01) | |
| *G02B 5/30* | (2006.01) | |
| *G02B 3/08* | (2006.01) | |

(52) U.S. Cl.
CPC .......... *G02B 27/0172* (2013.01); *G02B 5/30* (2013.01); *G02B 3/08* (2013.01); *G02B 2027/011* (2013.01); *G02B 2027/013* (2013.01); *G02B 2027/0136* (2013.01)

(58) Field of Classification Search
CPC .................................................. G02B 27/0172
USPC ........................................................... 359/631
See application file for complete search history.

(56) References Cited

U.S. PATENT DOCUMENTS

2017/0115485 A1*    4/2017    Saito ..................... B60K 35/00

FOREIGN PATENT DOCUMENTS

JP    2000-227574 A    8/2000

* cited by examiner

*Primary Examiner* — James C. Jones
(74) *Attorney, Agent, or Firm* — Procopio, Cory, Hargreaves & Savitch LLP

(57) ABSTRACT

A relay lens system forms an image displayed on an image display unit as an intermediate image. A luminous flux of the image emitted from the relay lens system reflected by a half mirror is incident to a curved combiner, and the combiner reflects the incident luminous flux to the half mirror to enable an observer to observe a virtual image through the half mirror. The relay lens system forms the intermediate image at an intermediate image forming position on an optical axis before a light reflected by the half mirror is incident to the curved combiner. The distance from the optical axis of the curved combiner to a light emission surface of the relay lens system is shorter than or equal to the distance from the optical axis of the curved combiner to a maximum reflection position.

8 Claims, 9 Drawing Sheets

IMAGE DISPLAY DEVICE

CROSS REFERENCE TO RELATED APPLICATION

This application is based upon and claims the benefit of priority from Japanese patent application No. 2018-043947, filed on Mar. 12, 2018, the disclosure of which is incorporated herein in its entirety by reference.

BACKGROUND

The present disclosure relates to an image display device.

Japanese Unexamined Patent Application Publication No. 2000-227574 discloses an image display device of a type which displays an image of a small display device as a virtual image to a user. The image display device of Japanese Unexamined Patent Application Publication No. 2000-227574 includes a relay optical system for forming the displayed image as an intermediate image and an eyepiece optical system for forming an exit pupil to guide the intermediate image to the user. The eyepiece optical system is composed of a half mirror and a concave mirror. In the image display device disclosed in Japanese Unexamined Patent Application Publication No. 2000-227574, a display luminous flux emitted from the relay optical system is reflected by the half mirror, is then reflected in the opposite direction by the concave mirror, and then passes through the half mirror and reaches the eyeball of the user.

SUMMARY

In the image display device disclosed in Japanese Unexamined Patent Application Publication No. 2000-227574, the displayed image of the small display device is largely expanded on the image plane of the intermediate image using the relay optical system, whereby a wide field of view is realized. In this case, when the intermediate image is formed on an optical member such as a half mirror or a concave mirror, the observation image may deteriorate due to dust or dirt attached to the optical member. Regarding this, Japanese Unexamined Patent Application Publication No. 2000-227574 discloses that the image plane of the intermediate image is formed between the relay optical system and the eyepiece optical system. Further, Japanese Unexamined Patent Application Publication No. 2000-227574 discloses that the image plane of the intermediate image may be formed in the eyepiece optical system.

However, in the image display device disclosed in Japanese Unexamined Patent Application Publication No. 2000-227574, when the image plane of the intermediate image is formed between the relay optical system and the eyepiece optical system, the distance between the relay optical system and the half mirror must be long, and thus there arises a problem that miniaturizing the device is difficult. Further, when the image plane of the intermediate image is formed in the eyepiece optical system, there may be a case in which the image plane of the intermediate image is formed on the optical path from a position where the light is reflected by the concave mirror to a position where the light reaches the eyeball of the user. In this case, the eyeball of the user cannot focus on the virtual image, and thus there arises a problem that the user cannot observe the virtual image.

The present disclosure provides an image display device including:

an image display unit;

a relay lens system configured to form an image displayed on the image display unit as an intermediate image;

a reflection/transmission unit configured to reflect a portion of an incident light and to transmit the rest of the incident light; and a curved mirror, to which a luminous flux of the image emitted from the relay lens system and reflected by the reflection/transmission unit is incident from the reflection/transmission unit, configured to reflect the luminous flux incident thereto to the reflection/transmission unit and to enable an observer to observe a virtual image of the image through the reflection/transmission unit, wherein:

the relay lens system forms the intermediate image, on an optical axis, at a position between a position where the light is reflected by the reflection/transmission unit and a position where the light reflected by the reflection/transmission unit is incident to the curved mirror, and in a cross section passing through an optical axis of the curved mirror and perpendicular to a horizontal direction of a field of view of the observer, a distance from the optical axis of the curved mirror to a light emission surface of the relay lens system is shorter than or equal to a distance from the optical axis of the curved mirror to a maximum reflection position indicating a position where a luminous flux emitted from an end of the image display unit is reflected at the curved mirror.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
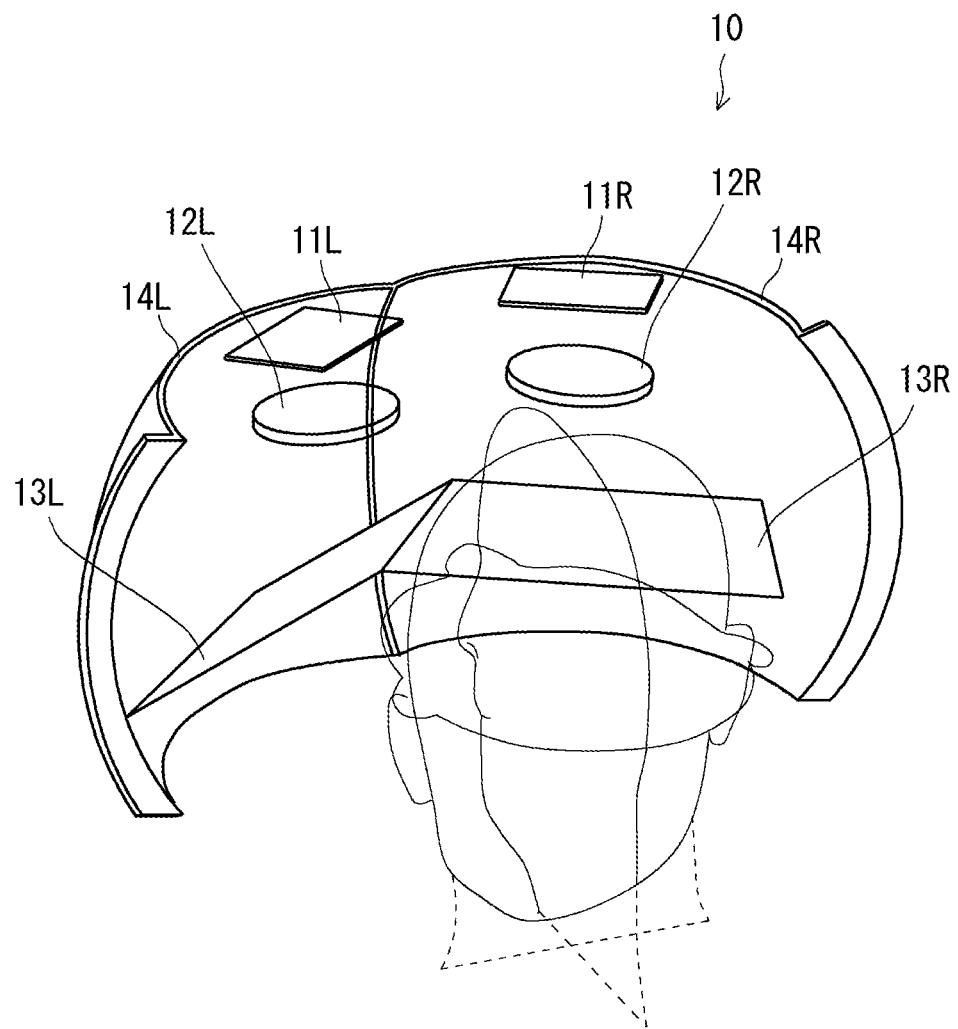
FIG. 1 is a perspective view showing an image display device according to an embodiment of the present disclosure.
Figure 2:
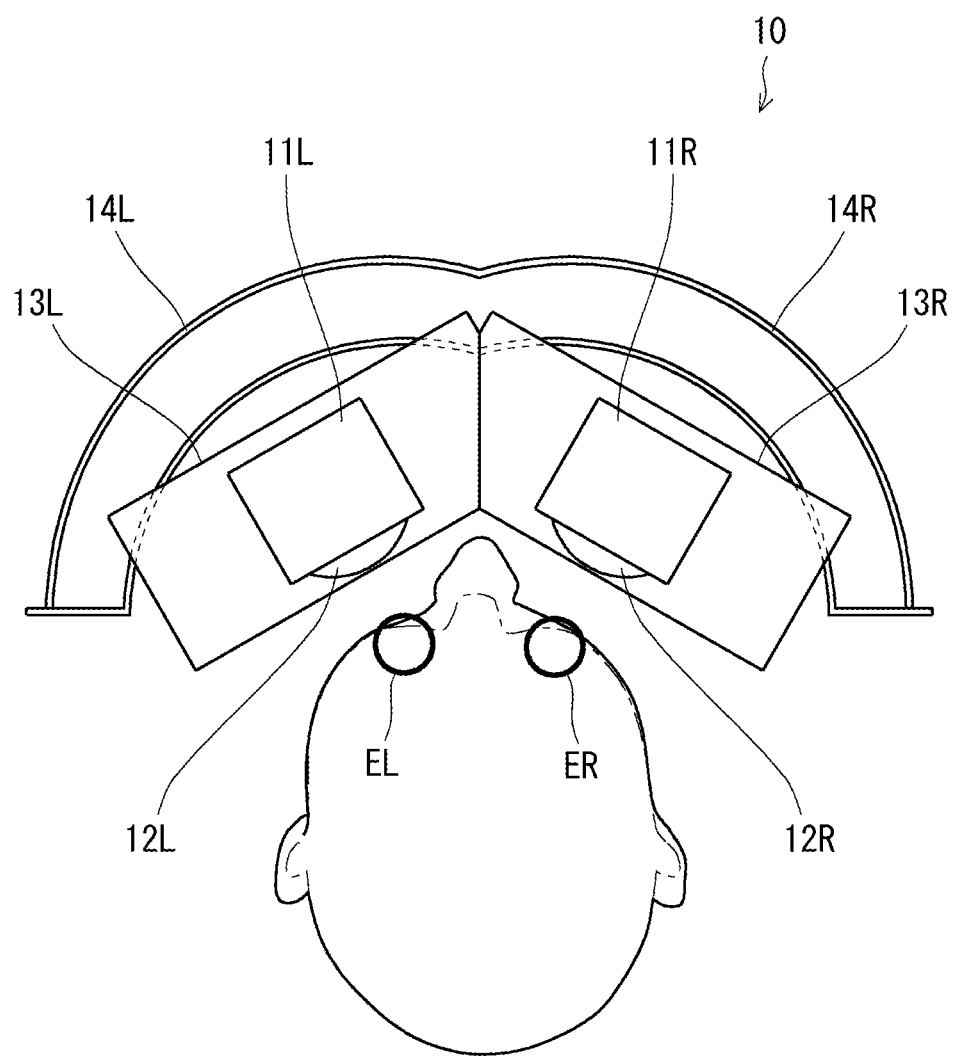
FIG. 2 is a top view showing the image display device.

Hereinafter, an embodiment of the present disclosure will be explained in detail with reference to the accompanying drawings. FIGS. 1 and 2 show an image display device according to an embodiment of the present disclosure. In the present embodiment, the image display device is configured as a head mounted display (HMD) 10 to be mounted on the head of a wearer (user). It should be noted that, in the following explanation, the front facing direction of the user's head may be referred to as "front", and the up-anddown direction of the line of sight of the user who wears the HMD 10 may be referred to as "vertical direction". Further, the right-to-left direction of the line of sight of the user may be referred to as "horizontal direction".

FIG. 1 is a perspective view of the HMD 10 viewed form the back of the user's head, and FIG. 2 is a top view of the HMD 10 viewed from the top of the user's head. The HMD 10 includes image display elements 11L and 11R, relay lens systems 12L and 12R, half mirrors 13L and 13R, and curved combiners 14L and 14R. In the HMD 10, the image display element 11L, the relay lens system 12L, the half mirror 13L, and the curved combiners 14L constitute a left eye optical system corresponding to the left eye EL of the user. Beside, in the HMD 10, the image display element 11R, the relay lens system 12R, the half mirror 13R, and the curved combiners 14R constitute a right eye optical system corresponding to the right eye ER of the user.

The above left eye optical system and the above right eye optical system respectively have the angle of view in horizontal direction of 82 degrees. The left eye optical system and the right eye optical system are arranged so that their central axes are directed outward by approximately 15 degrees with respect to the front face of the user's head, and are combined with the other optical system. The left eye optical system and the right eye optical system are arranged symmetrically with respect to the united surface. The overlapping portion of the field of view in the right-to-left direction is 30 degrees, and this portion can be adapted to so-called stereoscopic viewing. The total angle of view in the horizontal direction is 82 degrees×2-30 degrees=134 degrees.

Note that the left eye optical system and the right eye optical system basically have the same configuration. In the above explanation, the suffixes "L" and "R" of the reference numeral of each element indicate whether the optical element constitutes the left eye optical system or the right eye optical system. In the following explanation, when it is not necessary to particularly distinguish the left eye optical system and the right eye optical system, the suffixes "L" and "R" may be omitted.

Figure 3:
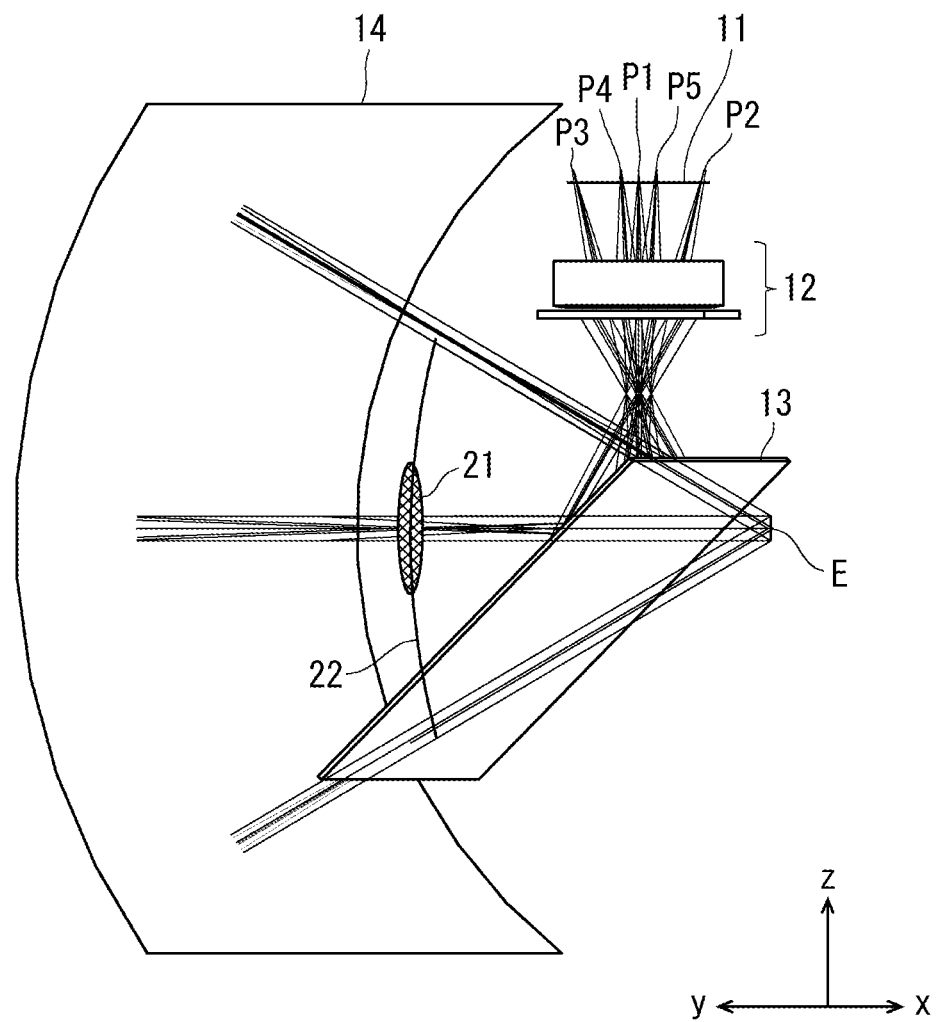
FIG. 3 is a perspective view showing one of optical systems viewed from the side.
Figure 4:
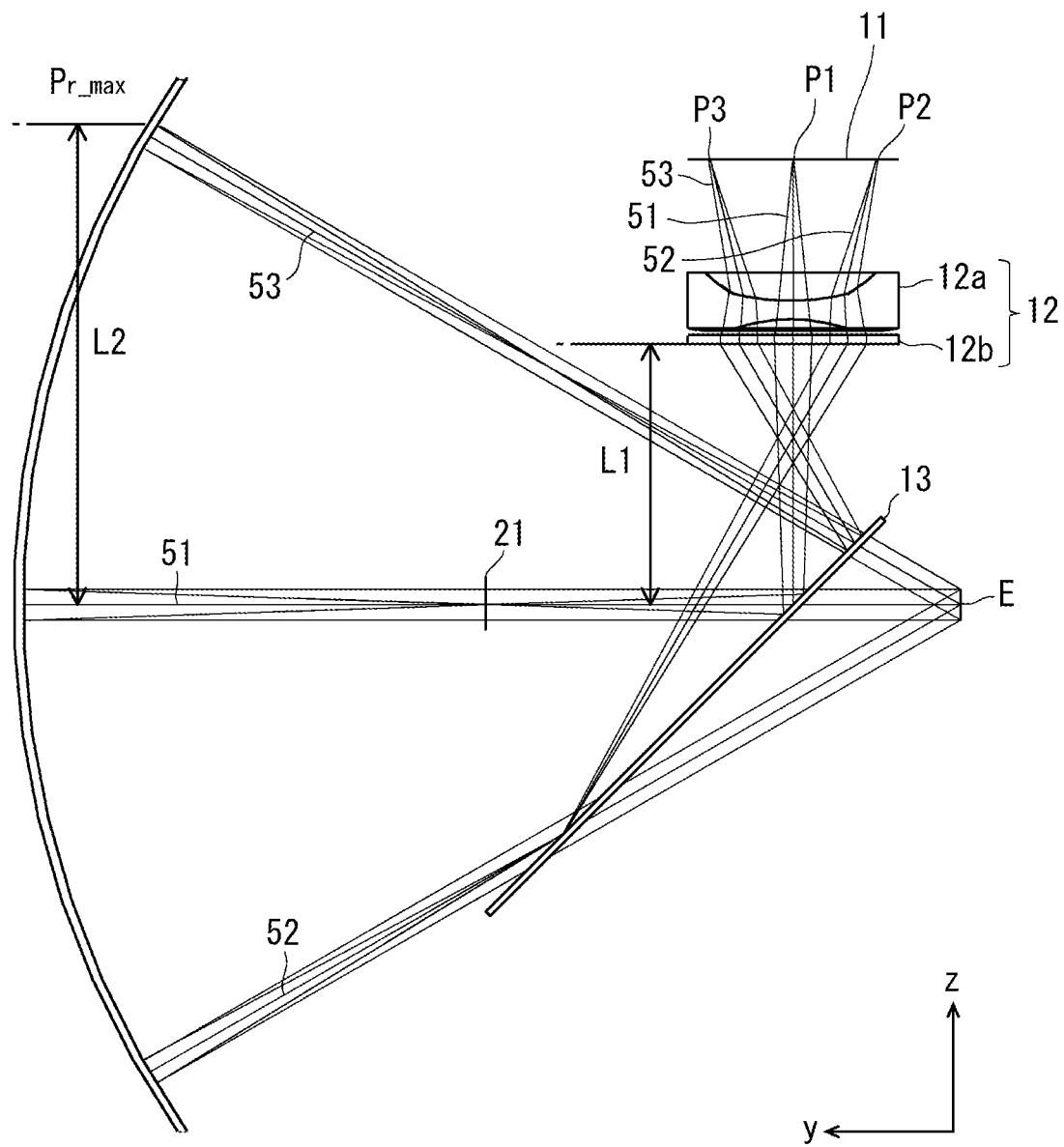
FIG. 4 is an optical path diagram showing a cross section of the optical system.
Figure 5:
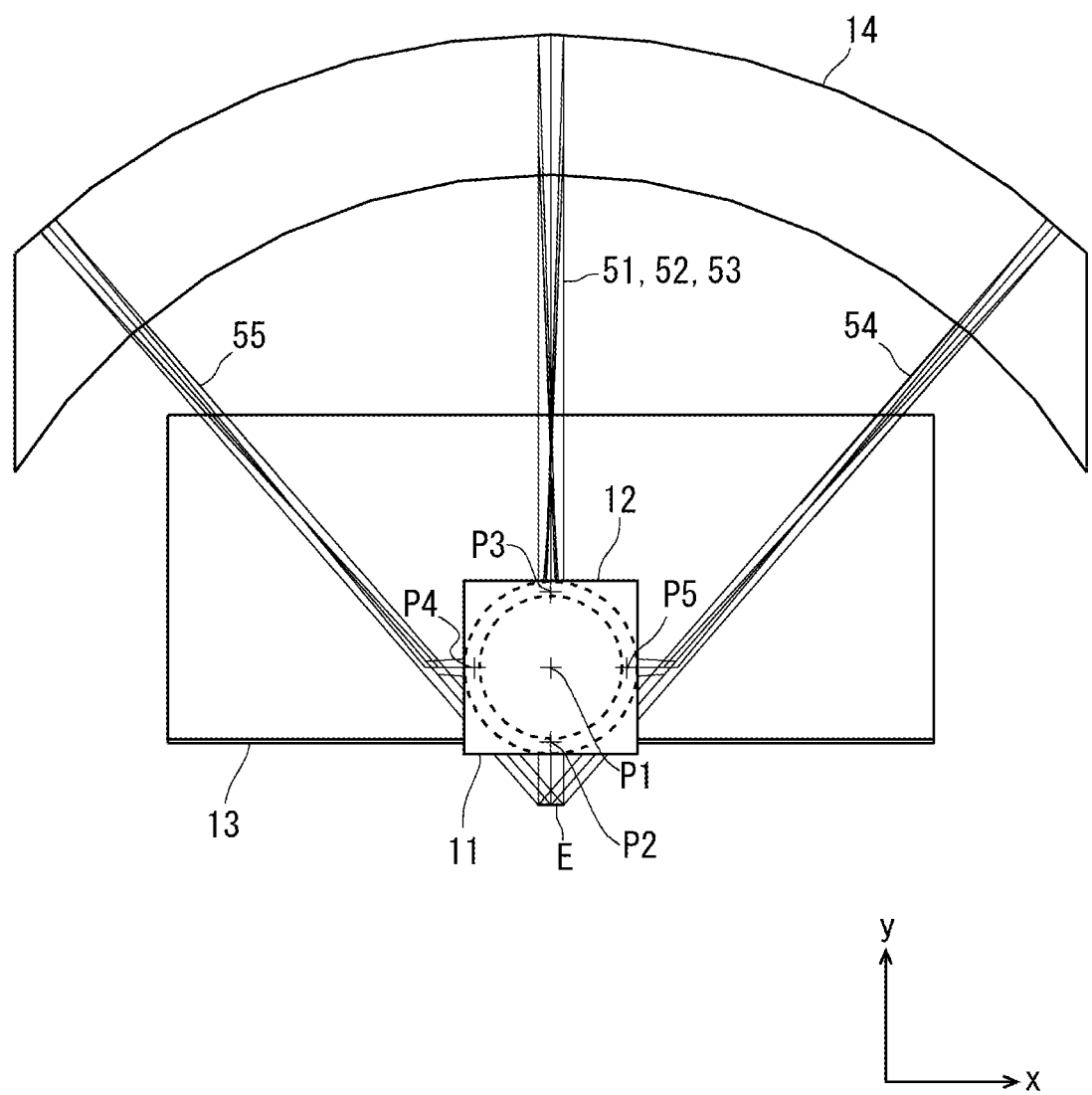
FIG. 5 is a top view showing the optical system viewed from the top.

FIG. 3 is a diagram showing one of the optical systems viewed from the side. Further, FIG. 4 is a sectional view of the optical system, a so-called optical path diagram, and FIG. 5 is a top view showing the optical system viewed from the upper side. The image display element 11 is a display device generating an image to be displayed. For example, a display device such as an LCD (Liquid Crystal Display) or an OLED (Organic Electro-Luminescence Display) is used for the image display element 11. The image display element 11 has, for example, a size of 33 mm in the X direction (lateral direction of the screen)×22 mm in the Y direction (longitudinal direction of the screen). The image display element 11 may be configured as a small projector, for example, projecting an image to the position of the image display element 11 shown in FIG. 3. The image display element 11 constitutes an image display unit.

Here, in the image display element 11, a position indicating the center in the X direction and the Y direction, namely the central position of the screen, is set as P1. In addition, in the center in the X direction, a position indicating one end in the Y direction is set as P2, and a position indicating the other end is set as P3. Further, in the center in the Y direction, a position indicating one end in the X direction is set as P4, and a position indicating the other end is set as P5. Luminous fluxes 51 to 55 respectively emitted from the positions P1 to P5 of the image display element 11 travel toward the relay lens system 12 while they are diverging.

In the HMD 10, the relay lens system 12, the half mirror 13, and the curved combiner 14 are coaxial optical systems sharing the optical axis with each other. The relay lens system 12 forms an image displayed on the image display element 11 as an intermediate image. The relay lens system 12 includes a concave lens 12a and a convex lens 12b. The relay lens system 12 acts as a convex lens having strong convergence power as a whole. For example, a Fresnel lens can be used as the convex lens 12b. When a Fresnel lens is used as the convex lens 12b, it is possible to suppress the thickness of the lens, and thus it is advantageous for downsizing the relay lens system 12.

It should be noted that the configuration of the relay lens system 12 is not particularly limited to those described above. The relay lens system 12 may act as, for example, a convex lens having strong convergence power as a whole. For example, in the relay lens system 12, a normal convex lens different from a Fresnel lens can be used as the convex lens 12b. Alternatively, the relay lens system 12 may have a configuration of only the convex lens 12b, or a configuration including a diffractive lens.

The display luminous fluxes of the image including the luminous fluxes 51 to 55, which are emitted from the image display element 11, are incident in the relay lens system 12 while they are diverging. The display luminous fluxes refracted by the relay lens system 12 travel toward the half mirror 13 while they are becoming convergent luminous fluxes. At this time, the luminous fluxes 51 to 55 intersect at a position between the relay lens system 12 and the half mirror 13, and then are incident on the half mirror 13 while they are spreading. The half mirror 13 reflects a portion of the incident light to the front (Y direction in FIG. 3, etc.), and transmits the rest in the Z direction (downward direction) in FIG. 3, etc. The half mirror 13 reflects, for example, 50% of the incident light and transmits the rest. The half mirror 13 constitutes a reflection/transmission unit.

The display luminous fluxes reflected by the half mirror 13 travel toward the curved combiner 14. At this time, the state of the luminous flux 51 becomes the most convergent at a position 21 between the half mirror 13 and the curved combiner 14, and an intermediate image (aerial image) is formed at the position 21. It should be noted that, with reference to FIG. 4, the position (intermediate image forming position) 21 where the luminous flux 51 emitted from the central position of the image display element 11 forms the intermediate image and positions where the state of the luminous fluxes 52 and 53 emitted from each end become the most convergent are misaligned, which is due to the aberration in the optical system. The intermediate image forming position 21 is an imaging position of an intermediate image calculated using the luminous flux 51 near the optical axis, and luminous fluxes near the optical axis converge at this position to form an intermediate image. On the other hand, a peripheral luminous flux does not always converge on a plane standing at the intermediate image forming position 21.

After the intermediate image forming position 21, the luminous flux 51 is incident on the curved combiner 14 while it is diverging. Similarly, the peripheral luminous fluxes 52 to 55 are incident on the curved combiner 14 while they are diverging. The curved combiner 14 is a translucent concave mirror, and it transmits a portion of incident luminous flux and reflects the rest. The curved combiner 14 combines a light incident from the external environment and the reflected light of the light incident from the half mirror 13. The luminous fluxes 51 to 55 reflected by the curved combiner 14 become substantially parallel light beams and travel to the half mirror 13 in the opposite direction. The half mirror 13 reflects a portion of the luminous flux incident from the curved combiner 14 and transmits the rest. The light transmitted through the half mirror 13 travels toward the eye (pupil) E of the user and then is incident on the pupil E. The luminous flux incident to the pupil E is imaged on the retina by the imaging action of the eyeball and is recognized as an image.

Here, a cross section passing through the optical axis of the curved combiner 14 and perpendicular to horizontal direction of the observer's field of view is considered. This cross section corresponds to the cross section shown in FIG. 4. In the cross section, a distance from the optical axis of the curved combiner 14 to a light emission surface of the relay lens system 12 is set as L1. Further, in FIG. 4, a position where the luminous flux 53 emitted from the position P3 of the image display element 11 is reflected by the curved combiner 14 is defined as a maximum reflection position $P_{r\_max}$. In the HMD 10 according to the present embodiment, when a distance from the optical axis of the curved combiner 14 to the maximum reflection position $P_{r\_max}$ in the above cross section is set as L2, L1<=L2 is satisfied. In this case, the light emission surface of the relay lens system 12 is closer to the optical axis than the maximum reflection position $P_{r\_max}$, and thus the HMD 10 can be downsized especially in the Z direction.

It should be noted that, in the above explanation, an example in which the reflection/transmission unit is configured as the half mirror 13 is explained, but the present disclosure is not limited thereto. For example, the reflection/transmission unit may have a configuration including a polarization beam splitter that reflects lights with a predetermined polarization plane and transmits lights with a polarization plane perpendicular to the predetermined polarization plane, and ¼ wavelength plate. In the configuration, ¼ wavelength plate is arranged between the polarization beam splitter and the curved combiner 14. When the polarization plane of the light emitted from the image display element 11 is aligned with the predetermined polarization, the polarization beam splitter reflects most of the incident light to the curved combiner 14. The light emitted to the curved combiner 14 passes through the ¼ wavelength plate and becomes circular polarized light, is reflected by the curved combiner 14, inversely passes through the ¼ wavelength plate, its polarization plane is rotated by 90 degrees, and passes through the polarization beam splitter. With such a configuration, the luminous fluxes are effectively used for the image observation, and the user can observe the bright image.

In addition, although an example in which a translucent concave mirror is used for the curved combiner 14 is explained, the present disclosure is not limited thereto. The HMD 10 according to the present embodiment is not limited to a see-through type HMD capable of observing the external environment, and may be a non-transmissive type HMD. In this case, a curved mirror which reflects almost the entire incident light may be used instead of the curved combiner 14. When the HMD 10 is configured as the see-through type device, the HMD 10 can be applied to applications such as AR (Augmented Reality) and MR (Mixed Reality) in which the display image of the image display element 11 is superimposed on the scenery of the external environment. On the other hand, when the HMD 10 is configured as the non-transmissive type device, the HMD 10 can be applied to an application such as VR (Virtual Reality).

An optical design example of the HMD 10 according to the present embodiment is shown in below Table 1.

TABLE 1

| # | NAME | CURVATURE RADIUS | SPACING | VITREOUS MATERIAL | CONIC COEFFICIENT | 4TH ORDER ASPHERICAL COEFFICIENT | 6TH ORDER ASPHERICAL COEFFICIENT | 8TH ORDER ASPHERICAL COEFFICIENT | 10TH ORDER ASPHERICAL COEFFICIENT |
|---|---|---|---|---|---|---|---|---|---|
| 1 | VIRTUAL IMAGE PLANE | 0 | −5000 | | | | | | |
| 2 | PUPIL PLANE | 0 | 150 | | | | | | |
| 3 | COMBINER | −150 | −75 | SPECULAR SURFACE | | | | | |
| 4 | INTERMEDIATE IMAGE PLANE | 0 | −45 | | | | | | |
| 5 | HALF MIRROR | 0 | 45 | SPECULAR SURFACE | K | A4 | A6 | A8 | A10 |
| 6 | FRESNEL LENS | 12.709 | 1.5 | ACRYLIC | $-6.2808 \times 10^{-1}$ | $-2.2086 \times 10^{-5}$ | $-1.3617 \times 10^{-7}$ | 0 | 0 |
| 7 | | −12.709 | 3 | | $-6.2808 \times 10^{-1}$ | $2.2086 \times 10^{-5}$ | $1.3617 \times 10^{-7}$ | 0 | 0 |
| 8 | ASPHERICAL LENS | −22.231 | 3 | SF57 | $-1.1042 \times 10$ | $7.4350 \times 10^{-6}$ | $-1.5831 \times 10^{-7}$ | $1.343 \times 10^{-9}$ | $-2.2472 \times 10^{-12}$ |
| 9 | | 178.897 | 22.19 | | $1.4268 \times 10^{2}$ | $1.7511 \times 10^{-4}$ | $-8.1163 \times 10^{-7}$ | $3.2333 \times 10^{-9}$ | $-7.3796 \times 10^{-12}$ |
| 10 | DISPLAY PLANE | 0 | 0 | | | | | | |

In the above Table 1, the element number #10 "DISPLAY PLANE" corresponds to the image display plane of the image display element 11. The element number #9 "ASPHERICAL LENS" corresponds to the concave lens 12a of the relay lens system 12, and the element number #6 "FRESNEL LENS" corresponds to the convex lens 12b. The element numbers #9 and #7 correspond to spaces (air spaces) between optical elements. The element number #5 "HALF MIRROR" corresponds to the half mirror 13, and the element number #3 "COMBINER" corresponds to the curved combiner 14. The element number #4 "INTERMEDIATE IMAGE PLANE" corresponds to the intermediate image forming position 21, and the element number #2 "PUPIL PLANE" corresponds to the pupil E of the user. The element number #1 "VIRTUAL IMAGE PLANE" corresponds to a plane where the virtual image to be observed by the user is formed. Note that the screen size of the image display element 11 is 33 mm×22 mm.

In the above Table 1, "SPACING" corresponds to thickness of the lens or distance to next optical element. In "SPACING", positive values indicate that the optical element exists in the right side or the downward direction in FIG. 4 as viewed from the next optical element. Further, negative values indicate that the optical element exists in the left side in FIG. 4 as viewed from the next optical element. For example, the spacing of the element number #1 "VIRTUAL IMAGE PLANE" is −5000 mm. This means that "VIRTUAL IMAGE PLANE" exits at a position 5000 mm away in left side of FIG. 4 as viewed from the element number #2 "PUPIL". Besides, the spacing of the element number #5 "HAFL MIRROR" is 45 mm. This means that "HALF MIRROR" exists in the downward direction in FIG. 4 viewed from the element number #6 "FRESNEL LENS".

The 4th, 6th 8th and 10th order aspherical coefficient values in the above Table 1 can be calculated by the following formula using the conic efficient and the curvature radius.

$$c = \frac{1}{r}$$

$$h = (x^2 + y^2)^{1/2}$$

$$z = \frac{ch^2}{1 + \{1 - (k+1)c^2h^2\}^{1/2}} + A_4h^4 + A_6h^6 + A_8h^8 + A_{10}h^{10}$$

Figure 6:
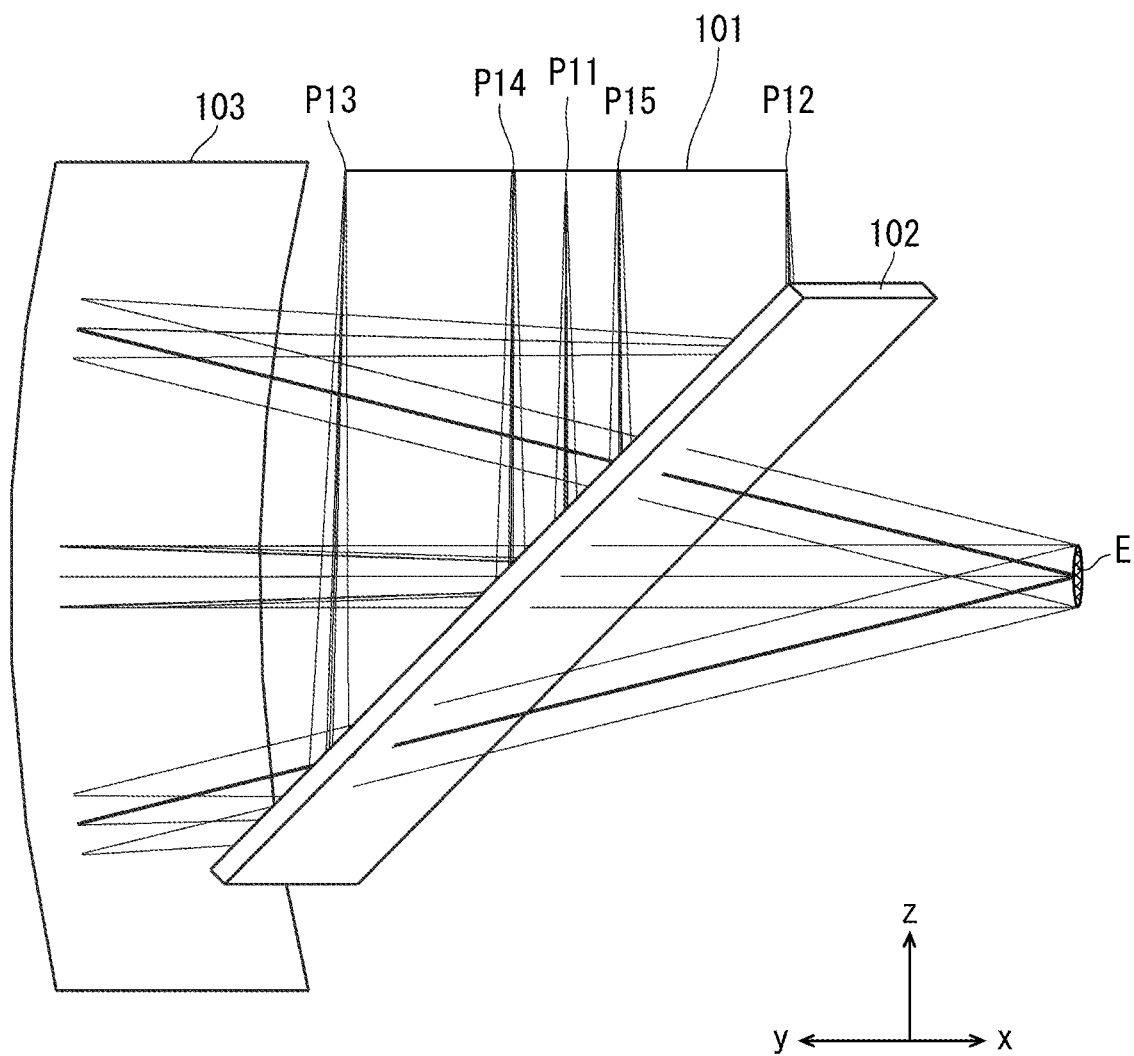
FIG. 6 is a perspective view showing an optical system corresponding to one eye in a comparative example.
Figure 7:
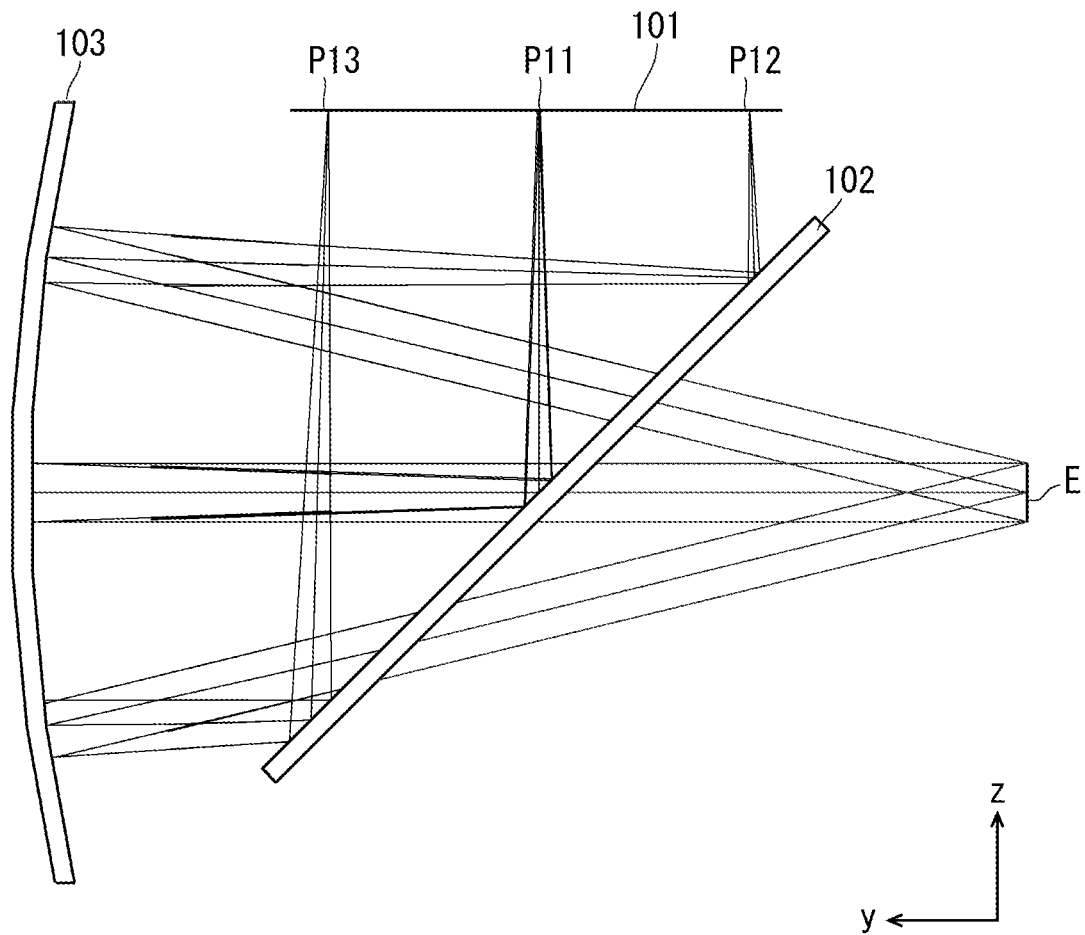
FIG. 7 is an optical path diagram showing a cross section of the optical system in the comparative example.
Figure 8:
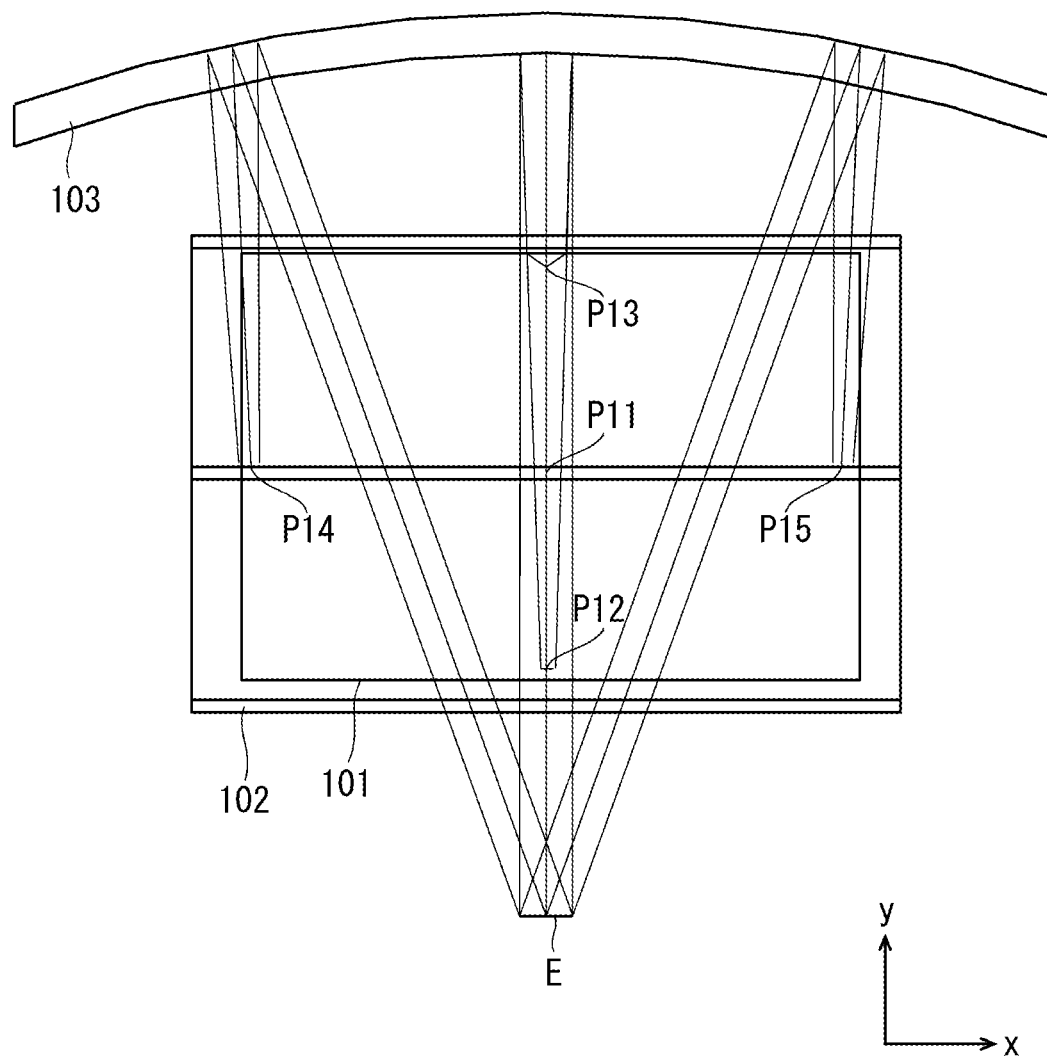
FIG. 8 is a top view showing the optical system in the comparative example viewed from the top.

Here, as a comparative example, an HMD without a relay lens system is considered. FIG. 6 is a diagram showing an optical system corresponding to one eye in an HMD according to a comparative example. FIG. 7 is a sectional view of the optical system, a so-called optical path diagram, and FIG. 8 is a top view showing the optical system viewed from the upper side. The HMD 100 according to the comparative example includes a display 101, a half mirror 102, and a curved combiner 103. The display 101 corresponds to the image display element 11 (refer to FIG. 3, etc.) of the HMD 10 according to the present embodiment, and the half mirror 102 corresponds to the half mirror 13 of the HMD 10. Further, the curved combiner 103 corresponds to the curved combiner 14 of the HMD 10.

In the display 101, a position indicating the center in the X direction and the Y direction is set as P11. Further, in the center in the X direction, a position indicating one end in the Y direction is set as P12 and a position indicating the other end is set as P13. Furthermore, in the center in the Y direction, a position indicating one end in the X direction is set as P14, and a position indicating the other end is set as P15. Luminous fluxes emitted from the position P11 to P15 of the display 101 travel toward the half mirror 102 while they are diverging.

The luminous fluxes emitted from the display 101 are incident on the half mirror 102, and a portion of the incident luminous fluxes is reflected to the curved combiner 103. The curved combiner 103 reflects a portion of the light incident from the half mirror 102. The light reflected by the curved combiner 103 becomes substantially parallel light beams and is incident on the half mirror 102, and a portion of the incident light transmits the half mirror 102 and then incident on the pupil E of the user. The luminous flux incident to the pupil E is imaged on the retina by the imaging action of the eyeball and is recognized as an image. It is assumed that the size of the display 101 is 33 mm×22 mm.

When comparing FIG. 5 and FIG. 8, the horizontal angle of view is 81.8 degrees in the HMD 10 according to the present embodiment, whereas the horizontal angle of view is 40.3 degrees in the HMD 100 according to the comparative example. Further, when comparing the FIG. 4 and FIG. 7, the vertical angle of view is 60.0 degrees in the HMD 10 according to the present embodiment, whereas the vertical angle of view is 27.4 degrees in the HMD 100 according to the comparative example. As can be seen from those, in the HMD 10 according to the present embodiment in which the relay lens system 12 is used, a wide angle of view can be obtained both in the horizontal direction and the vertical direction.

Here, the relationship of the screen size, the curvature radius of the curved combiner, and the angle of view will be explained. When a half angle of view which is a half of the angle of view is set as $\theta$, and a half of the screen size is set as an image height y, the relationship between the half angle of view $\theta$ and the image height y is calculated by the following equation.

$$y = f \times \tan\theta \quad (1)$$

From the above equation, the angle of view $2\theta$ can be calculated by the following equation.

$$2\theta = \tan^{-1}(y/f) \times 2 \quad (2)$$

In the above equations 1 and 2, f represents the focal length of an imaging lens system, which is equal to ½ times of the radius of the curved combiner.

For example, regarding to the horizontal direction, in the comparative example, the image height (image width) is y=16.5 mm and the focal length is f=45 mm, and the angle of view is 2θ=40.2 degrees. Further, in a product having a similar configuration actually sold, the image height is y=7.2 mm and the focal length is f=27.5 mm, and the angle of view is 2θ=29.3 degrees. With reference to the equation 2, it is understood that by increasing the screen size and reducing the radius of the curved combiner, it is possible to achieve a wide angle of view.

Figure 9:
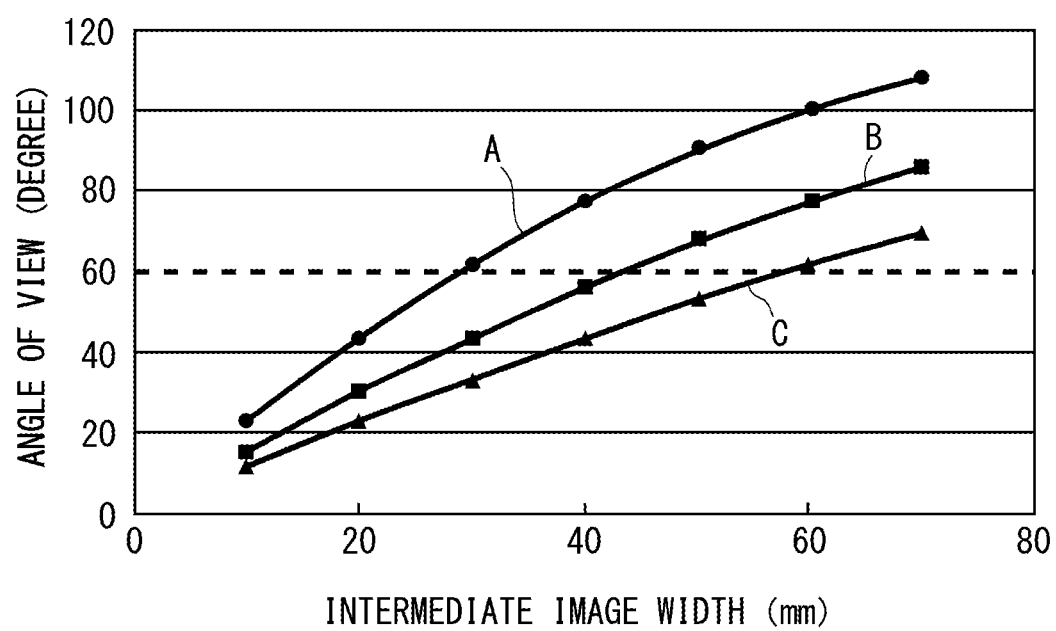
FIG. 9 is a graph showing the relationship between the width of the intermediate image and the angle of view.

FIG. 9 shows the relationship of the image height (intermediate image width), the angle of view, and the focal length of the curved combiner. In a graph shown in FIG. 9, the vertical axis represents the angle of view and the horizontal axis represents the intermediate image width. In FIG. 9, the graph A shows the relationship between the intermediate image width and the angle of view when the focal length f of the curved combiner equals to 50 mm. Further, the graph B shows the relationship between the intermediate image width and the angle of view when the focal length f of the curved combiner equals to 75 mm, and the graph C shows the relationship between the intermediate image width and the angle of view when the focal length f of the curved combiner equals to 100 mm.

Referring to FIG. 9, when the focal length of the curved combiner is constant, it is understood that as the intermediate image width becomes wider, the wider angle of view can be realized. Further, when the intermediate image width is constant, it is understood that as the focal length of the curved combiner becomes shorter, in other words, the radius of the curved mirror becomes smaller, the wider angle of view can be realized.

In the HMD 10 according to the present embodiment, the relay lens system 12 generates the intermediate image enlarging the screen size of the image display element 11. In this way, when the image display element 11 and the display 101 of the HMD 100 according to the comparative example have the same screen size, the wide angle of view can be realized in the HMD 10 comparing to the HMD 100 according to the comparative example. When values of the present embodiment are applied to the above equation 2, the intermediate image width y is 66.0, the focal length f of the curved combiner is 75, and the angle of view 2θ is 82.7 degrees. That is to say, the screen size is enlarged so as to be four times the actual screen size of the image display element 11 in the present embodiment.

It should be noted that the reason why the focal length f of the curved combiner in the HMD 100 according to the comparative embodiment is different from that of the HMD 10 according to the present embodiment is because, for each configuration, values which can realize the field of view as wide as possible and which adopt realistic layouts are applied. Although there are some differences according to the design, there are circumstances that the values cannot be changed so much freely due to the arrangement of each optical element. Further, the reason why the value of the angle of view slightly differs from the above-mentioned value of the angle of view is due to the aberration of the optical system.

Next, the limitation of the angle of view and the focal length f of the curved combiner will be explained. The relationship between the image height y and the focal length f is determined from the above equation 1. Namely, it is determined by a below equation 3.

$$y/f = \tan \theta \quad (3)$$

It is assumed here that a reference angle of view which can be called the wide angle of view is set the horizontal angle of view of 60 degrees. That is, it is assumed that when the horizontal angle of view is 60 degrees or more, the wide angle of view is realized. By substituting 60 degrees for θ in Equation 3, $y/f = 0.58$ is obtained, and a condition for realizing a wide angle of view is that the ratio of the image height y to the focal length f is 0.58 or more. The value of y/f is 0.37 in the HMD 100 according to the comparative example, the value of y/f is 0.26 in the aforementioned product, and the value of y/f is 0.88 in the HMD 10 according to the present embodiment.

Subsequently, the position of the intermediate image is will be explained. The position where the intermediate image is formed is a position where luminous fluxes are most convergent, and if an optical member is arranged at this position, influence of scratches or dirt of the optical member easily appears in the image. Regarding this, in Japanese Unexamined Patent Application Publication No. 2000-227574, the image forming plane of the intermediate image is formed between the relay optical system and the eye-piece optical system or in the eye-piece optical system. As another example, there is an example in which an optical member such as a light guide member is used and the intermediate image is formed in the light guide member. In contrast, in the present embodiment, the intermediate image is arranged at a position between the half mirror 13 and the curved combiner 14.

With reference to FIG. 4, etc., in order to make the intermediate image large to widen the angle of view, it is necessary to separate the position of the intermediate image away from the relay lens system 12. However, when the intermediate image is formed at a position away from the relay lens system 12 between the relay lens system 12 and the half mirror 13, there arises a problem that the entire optical system becomes large. For this reason, the position of the intermediate image is preferably set behind the half mirror 13. On the other hand, when the intermediate image is formed at a position between a position where the luminous fluxes are reflected by the curved combiner 14 and a position where the luminous fluxes are incident on the pupil E, the image cannot be formed on the retina. Accordingly, in the present embodiment, the position of the intermediate image is arranged on the optical axis between a position where the luminous fluxes are reflected by the half mirror 13 and a position where the luminous fluxes are incident on the curved combiner 14.

Next, the limitation of the screen size and the magnification of the relay lens system will be explained. As already mentioned, the condition for realizing the horizontal angle of view of 60 degrees or more is that the ratio of y to f is 0.58 or more. When the intermediate image width which satisfies the condition is calculated with respect to the focal length f of various curved combiners, which is as same as half of radius of the curved combiner, below Table 2 is obtained. The intermediate image half width x in the below Table 2 corresponds to y in the equation 3.

TABLE 2

THE RELATIONSHIP BETWEEN THE COMBINER f
AND THE INTERMEDIATE IMAGE HALF WIDTH x

| f(mm) | INTERMEDIATE IMAGE HALF WIDTH x(mm) | 2θ(degrees) | x/f |
|---|---|---|---|
| 12.5 | 7.2 | 60 | 0.58 |
| 25 | 14.4 | 60 | 0.58 |
| 50 | 28.9 | 60 | 0.58 |
| 75 | 43.3 | 60 | 0.58 |
| 100 | 57.7 | 60 | 0.58 |

The size of the small display used for the HMD is about 0.2 to 2.0 in size. At this time, the half width X of the display in lateral direction is about 2 mm to 20 mm. The radius of the combiner which can be actually implemented in a combiner type HMD having a half mirror is about 50 mm to 200 mm, and the focal length f is about 12.5 mm to 100 mm. When the configuration of the HMD is the above values, and the magnification m of the relay lens system which satisfies the condition of the horizontal angle of view of 60 degrees is calculated, below Table 3 is obtained.

TABLE 3

THE MAGNIFICATION OF RELAY LENS SYSTEM SATISFYING THE
CONDITION OF THE HORIZONTAL ANGLE OF VIEW OF 60 DEGREES

| x(mm) | X(mm) | M(times) | x(mm) | X(mm) | m(times) | x(mm) | X(mm) | m(times) |
|---|---|---|---|---|---|---|---|---|
| 7.2 | 2 | 3.6 | 7.2 | 10 | 0.7 | 7.2 | 20 | 0.4 |
| 14.4 | 2 | 7.2 | 14.4 | 10 | 1.4 | 14.4 | 20 | 0.7 |
| 28.9 | 2 | 14.4 | 28.9 | 10 | 2.9 | 28.9 | 20 | 1.4 |

TABLE 3-continued

THE MAGNIFICATION OF RELAY LENS SYSTEM SATISFYING THE
CONDITION OF THE HORIZONTAL ANGLE OF VIEW OF 60 DEGREES

| x(mm) | X(mm) | M(times) | x(mm) | X(mm) | m(times) | x(mm) | X(mm) | m(times) |
|---|---|---|---|---|---|---|---|---|
| 43.3 | 2 | 21.7 | 43.3 | 10 | 4.3 | 43.3 | 20 | 2.2 |
| 57.7 | 2 | 28.9 | 57.7 | 10 | 5.8 | 57.7 | 20 | 2.9 |

With reference to FIG. 3, in cases where a small display of 0.2 to 2.0 in size is used for the HMD, it is understood that, to make the horizontal angle of view 60 degrees or more, the magnification of the relay lens system may be selected from a range of 0.4 times or more to 28.9 times or less.

When similar calculation is applied with respect to the horizontal angle of view of 80 degrees, below Tables 4 and 5 are obtained.

TABLE 4

THE RELATIONSHIP BETWEEN THE COMBINER f
AND THE INTERMEDIATE IMAGE HALF WIDTH x

| f(mm) | INTERMEDIATE IMAGE HALF WIDTH x(mm) | 2θ(degrees) | x/f |
|---|---|---|---|
| 12.5 | 10.5 | 80 | 0.84 |
| 25 | 21.0 | 80 | 0.84 |
| 50 | 42.0 | 80 | 0.84 |
| 75 | 62.9 | 80 | 0.84 |
| 100 | 83.9 | 80 | 0.84 |

TABLE 5

THE MAGNIFICATION OF RELAY LENS SYSTEM SATISFYING THE
CONDITION OF THE HORIZONTAL ANGLE OF VIEW OF 80 DEGREES

| x(mm) | X(mm) | M(times) | x(mm) | X(mm) | m(times) | x(mm) | X(mm) | m(times) |
|---|---|---|---|---|---|---|---|---|
| 10.5 | 2 | 5.2 | 10.5 | 10 | 1.0 | 10.5 | 20 | 0.5 |
| 21.0 | 2 | 10.5 | 21.0 | 10 | 2.1 | 21.0 | 20 | 1.0 |
| 42.0 | 2 | 21.0 | 42.0 | 10 | 4.2 | 42.0 | 20 | 2.1 |
| 62.9 | 2 | 31.5 | 62.9 | 10 | 6.3 | 62.9 | 20 | 3.1 |
| 83.9 | 2 | 42.0 | 83.9 | 10 | 8.4 | 83.9 | 20 | 4.2 |

Further, when similar calculation is applied with respect to the horizontal angle of view of 100 degrees, below Tables 6 and 7 are obtained.

TABLE 6

THE RELATIONSHIP BETWEEN THE COMBINER f
AND THE INTERMEDIATE IMAGE HALF WIDTH x

| f(mm) | INTERMEDIATE IMAGE HALF WIDTH x(mm) | 2θ(degrees) | x/f |
|---|---|---|---|
| 12.5 | 14.9 | 100 | 1.19 |
| 25 | 29.8 | 100 | 1.19 |
| 50 | 59.6 | 100 | 1.19 |
| 75 | 89.4 | 100 | 1.19 |
| 100 | 119.2 | 100 | 1.19 |

TABLE 7

THE MAGNIFICATION OF RELAY LENS SYSTEM SATISFYING THE CONDITION
OF THE HORIZONTAL ANGLE OF VIEW OF 100 DEGREES

| x(mm) | X(mm) | M(times) | x(mm) | X(mm) | m(times) | x(mm) | X(mm) | m(times) |
|---|---|---|---|---|---|---|---|---|
| 14.9 | 2 | 7.4 | 14.9 | 10 | 1.5 | 14.9 | 20 | 0.7 |
| 29.8 | 2 | 14.9 | 29.8 | 10 | 3.0 | 29.8 | 20 | 1.5 |
| 59.6 | 2 | 29.8 | 59.6 | 10 | 6.0 | 59.6 | 20 | 3.0 |
| 89.4 | 2 | 44.7 | 89.4 | 10 | 8.9 | 89.4 | 20 | 4.5 |
| 119.2 | 2 | 59.6 | 119.2 | 10 | 11.9 | 119.2 | 20 | 6.0 |

With reference to the Tables 3, 5, and 7, it is understood that, to make the horizontal angle of view 60 degrees to 100 degrees per eye which can be called the wide angle of view, the magnification of the relay lens system may be set in a range of 0.4 times or more to 59.6 times or less.

It should be noted that, in fact, the horizontal angle of view per eye of 100 degrees or more is practically excessive for the HMD. The value of the ratio of y to f for realizing the horizontal angle of view of 100 degrees is 1.19, and this value is the upper limit of the ratio of y to f.

In summary, in the HMD 10 according to the present embodiment, an image of the small image display element 11 is enlarged or reduced by the relay lens system 12 and the curved combiner 14 so it can be observed by the observer. In the present embodiment, the relay lens system 12 forms the image of the image display element 11 as an intermediate image at a position on the optical axis from the half mirror 13 to the curved combiner 14. In the present embodiment, since the intermediate image is formed at a position on the optical axis between the half mirror 13 and the curved combiner 14, it is possible to suppress the deterioration of the image due to dust or dirt on an optical member. At this time, there may be a case where luminous fluxes emitted from ends of the screen of the image display element 11 are most convergent on the half mirror 13 or at a position close to the half mirror 13. However, in many cases, the user does not carefully observe the peripheral area of the image, whereby it is not so problematic even if the image deteriorates a little due to the dust or dirt of the optical member.

Further, in the present embodiment, in a cross section passing through the optical axis of the curved combiner 14 and perpendicular to the horizontal direction of a field of view of the observer, the distance L1 from the optical axis to the light emission surface of the relay lens system 12 system is shorter than or equal to the distance L2 from the optical axis to the maximum reflection position $P_{r\_max}$. By doing so, the HMD 10 can be downsized particularly in the vertical direction.

It should be noted that although an example in which the HMD 10 has a pair of right and left optical systems is explained, the present disclosure is not limited thereto. The HMD 10 may be a device that has one optical system either on the right or the left. Further, in the above embodiment, although an example in which the image display device is an HMD to be mounted on the user's head is explained, the present disclosure is not limited thereto. The image display device is not particularly limited to the HMD as long as it is a device which allows the user to observe a virtual image.

While the present disclosure has been described in terms of an embodiment, those skilled in the art will recognize that the present disclosure can be practiced with various modifications within the spirit and scope of the appended claims and the present disclosure is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. An image display device comprising:
an image display unit;
a relay lens system configured to form an image displayed on the image display unit as an intermediate image;
a reflection/transmission unit configured to reflect a portion of an incident light and to transmit the rest of the incident light; and
a curved mirror, to which a luminous flux of the image emitted from the relay lens system and reflected by the reflection/transmission unit is incident from the reflection/transmission unit, configured to reflect the luminous flux incident thereto to the reflection/transmission unit and to enable an observer to observe a virtual image of the image through the reflection/transmission unit,
wherein:
the relay lens system forms the intermediate image, on an optical axis, at a position between a position where the light is reflected by the reflection/transmission unit and a position where the light reflected by the reflection/transmission unit is incident to the curved mirror, and
in a cross section passing through an optical axis of the curved mirror and perpendicular to a horizontal direction of a field of view of the observer, a distance from the optical axis of the curved mirror to a light emission surface of the relay lens system is shorter than or equal to a distance from the optical axis of the curved mirror to a maximum reflection position indicating a position where a luminous flux emitted from an end of the image display unit is reflected at the curved mirror.

2. The image display device according to claim 1, wherein when a focal length of the curved mirror is f, and a width of the intermediate image in the horizontal direction of the field of view of the observer is x, a value of x/f is 0.58 or more and 1.19 or less.

3. The image display device according to claim 1, wherein a magnification of the relay lens system is set to a range of 0.4 times or more and 59.6 times or less.

4. The image display device according to claim 1, wherein the relay lens system, the reflection/transmission unit, and the curved mirror are coaxial optical systems sharing an optical axis with each other.

5. The image display device according to claim 1, wherein the curved mirror is a curved combiner which combines an incident light from external environment and a reflected light of a light incident from the reflection/transmission unit.

6. The image display device according to claim 1, wherein the reflection/transmission unit includes a half mirror which transmits a portion of a light and reflects at least a portion of the light not transmitted.

7. The image display device according to claim 1, wherein the reflection/transmission unit includes a polarization beam splitter which reflects a light with a predetermined polarization plane and transmits a light with a polarization plane perpendicular to the predetermined polarization plane, and a ¼ wavelength plate arranged between the curved mirror and the polarization beam splitter.

8. The image display device according to claim 1, wherein the relay lens system includes a concave lens and a convex lens.

* * * * *